United States Patent
Zhang et al.

(10) Patent No.: US 9,420,291 B2
(45) Date of Patent: Aug. 16, 2016

(54) METHODS AND APPARATUS FOR REDUCING VECTOR QUANTIZATION ERROR THROUGH PATCH SHIFTING

(75) Inventors: Dong-Qing Zhang, Plainsboro, NJ (US); Joan Llach, Cesson Sevigne (FR); Sitaram Bhagavathy, Plainsboro, NJ (US)

(73) Assignee: THOMSON LICENSING, Issy-les Moulineaux (FR)

( * ) Notice: Subject to any disclaimer, the term of this patent is extended or adjusted under 35 U.S.C. 154(b) by 643 days.

(21) Appl. No.: 13/576,848

(22) PCT Filed: Feb. 1, 2011

(86) PCT No.: PCT/US2011/000186
§ 371 (c)(1),
(2), (4) Date: Sep. 26, 2012

(87) PCT Pub. No.: WO2011/097013
PCT Pub. Date: Aug. 11, 2011

(65) Prior Publication Data
US 2013/0028330 A1   Jan. 31, 2013

Related U.S. Application Data

(60) Provisional application No. 61/300,551, filed on Feb. 2, 2010.

(51) Int. Cl.
*H04N 7/12*       (2006.01)
*H04N 19/105*    (2014.01)
(Continued)

(52) U.S. Cl.
CPC ........... *H04N 19/105* (2014.11); *G06T 1/00* (2013.01); *H04N 19/139* (2014.11); *H04N 19/14* (2014.11); *H04N 19/59* (2014.11); *H04N 19/593* (2014.11); *H04N 19/94* (2014.11)

(58) Field of Classification Search
USPC .................................................. 375/240.22
See application file for complete search history.

(56) References Cited

U.S. PATENT DOCUMENTS

| 2002/0172434 A1 | 11/2002 | Freeman et al. |
| 2005/0019000 A1* | 1/2005 | Lim et al. .................. 386/46 |

(Continued)

FOREIGN PATENT DOCUMENTS

| JP | 2003-18398 | 1/2003 |
| JP | 2009-159171 | 7/2009 |

(Continued)

OTHER PUBLICATIONS

Bishop, C.M. et al., "Super-resolution Enhancement of Video", In Proceedings of the 9th Conference on Artificial Intelligence and Statistics (AISTATS 2003), Jan. 3, 2003, XP002631362.

(Continued)

*Primary Examiner* — Tracy Li
(74) *Attorney, Agent, or Firm* — Brian J. Dorini; Ronald J. Kolczynski

(57) ABSTRACT

Methods and apparatus are provided for reducing vector quantization error through patch shifting. A method generates, from an input video sequence, one of more high resolution replacement patches, the one or more high resolution replacement patches for replacing one or more low resolution patches during a reconstruction of the input video sequence. This generating step generates the one or more high resolution replacement patches using data corresponding to a patch spatial shifting process, the patch spatial shifting process for reducing jittery artifacts caused by a motion-induced vector quantization error in the one or more high resolution replacement patches, the data for at least deriving a patch size of the one or more high resolution replacement patches such that the one or more high resolution replacement patches are generated to have the patch size greater than a patch size of the one or more low resolution patches in order to be suitable for use in the patch spatial shifting process.

35 Claims, 14 Drawing Sheets

(51) Int. Cl.
*G06T 1/00* (2006.01)
*H04N 19/139* (2014.01)
*H04N 19/593* (2014.01)
*H04N 19/14* (2014.01)
*H04N 19/94* (2014.01)
*H04N 19/59* (2014.01)

(56) References Cited

U.S. PATENT DOCUMENTS

| | | |
|---|---|---|
| 2007/0041663 A1 | 2/2007 | Cho et al. |
| 2008/0095235 A1* | 4/2008 | Hsiang ............... 375/240.13 |
| 2009/0161992 A1* | 6/2009 | Taguchi et al. ........... 382/299 |
| 2010/0027686 A1* | 2/2010 | Zuo et al. ............ 375/240.29 |

FOREIGN PATENT DOCUMENTS

| | | |
|---|---|---|
| JP | 2009-207001 | 9/2009 |
| WO | WO2009141770 | 11/2009 |

OTHER PUBLICATIONS

Li, X. et al., "Example-based image super-resolution with class-specific predictors", Journal of Visual Communication and Image Representation, vol. 20, Apr. 7, 2009, pp. 312-322, XP002631625.

Brandi, F. et al., "Super-resolution of video using key frames and motion estimation", Image Processing, 2008. ICIP 2008. 15th IEEE International Conference, IEEE, Piscataway, NJ, USA, Oct. 12, 2008, pp. 321-324, XP031374003.

Datsenko, D. et al., "Example-based single document image super-resolution: a global MAP approach with outlier rejection", Multidimensional Systems and Signal Processing; An International Journal, Kluwer Academic Publishers, BO, vol. 18, No. 2-3, Apr. 13, 2007, pp. 103-121, XP019506573.

Freeman, W.T. et al., "Example-based super-resolution", IEEE Computer Graphics and Applications, IEEE Service Center, New York, NY, US, vol. 22, No. 2, Mar. 1, 2002, pp. 56-65, XP011094241.

Cheung, V. et al., "Video Epitomes", In Proceedings of the IEEE Conference on Computer Vision and Pattern Recognition, IEEE Computer Society Press, Los, Alamitos, CA, Jun. 2005.

Jojic, N. et al., "Epitomic analysis of appearance and shape", Computer Vision, 2003, Proceedings, Ninth IEEE International Conference ON, pp. 34-41, vol. 1, Oct. 13-16, 2003.

ITU-T, Telecommunication Standardization Sector of ITU, H.264 (Mar. 2005), Series H:Audiovisual and Multimedia Systems, Infrastructure of audiovisual services—Coding of moving video, Advanced Video Coding for Generic Audiovisual Services, ITU-T Recommendation H.264. (343 pages).

PCT International Search Report mailed: Apr. 29, 2011.

* cited by examiner

METHODS AND APPARATUS FOR REDUCING VECTOR QUANTIZATION ERROR THROUGH PATCH SHIFTING

CROSS-REFERENCE TO RELATED APPLICATIONS

This application claims the benefit, under 35 U.S.C. §365 of International Application PCT/US2011/000186 and filed Feb. 1, 2011, which was published in accordance with PCT Article 21(2) on Aug. 11, 2011, in English, and which claims the benefit of U.S. Provisional Patent Application No. 61/300, 551, filed on Feb. 2, 2010, in English, which are incorporated by reference in their respective entireties. entirety.

TECHNICAL FIELD

The present principles relate generally to vector quantization and, more particularly, to methods and apparatus for reducing vector quantization error through patch shifting.

BACKGROUND

We have previously developed an example-based super resolution method and apparatus for video data pruning (hereinafter referred to as the "example-based super resolution method"). Example-based super resolution is a super resolution technique that converts a low-resolution picture into a high resolution picture by finding high resolution patches in a patch library using low resolution patches in the input picture as query keywords, and replacing low resolution patches in the low resolution input picture with the retrieved high resolution patches.

In further detail, in this example-based super resolution method, high-resolution video frames at the encoder side are divided into images patches or blocks (for example, in one implementation of the example-based super resolution method, we use 16×16 pixel blocks). The image patches are then grouped into a number of clusters. The representative patches of the clusters are sent to the decoder side along with downsized frames. At the decoder side, the representative patches are extracted. The patches in the low-resolution videos are replaced by the high-resolution representative patches to create a recovered high-resolution video.

Turning to FIG. 1, a high level block diagram of an example-based super resolution system/method is indicated generally by the reference numeral 100. High resolution (HR) frames are input and subjected to encoder side pre-processing at step 110 (by an encoder side pre-processor 151) in order to obtain down-sized frames and patch frames. The down-sized frames and patch frames are encoded (by an encoder 152) at step 115. The encoded down-sized frames and patch frames are decoded (by a decoder 153) at step 120. The low down-sized frames and patch frames are subjected to super resolution post-processing (by a super resolution post-processor 154) in order to provide high resolution output frames at step 125.

Turning to FIG. 2, a high level block diagram of the encoder side pre-processing corresponding to the example-based super resolution system/method of FIG. 1 is indicated generally by the reference numeral 200. Input video is subjected to patch extraction and clustering at step 210 (by a patch extractor and clusterer 251) to obtain clustered patches. Moreover, the input video is also subjected to downsizing at step 215 (by a downsizer 252) to output downsized frames there from. Clustered patches are packed into patch frames at step 220 (by a patch packer 252) to output the (packed) patch frames there from.

Turning to FIG. 3, a high level block diagram of the decoder side post-processing corresponding to the example-based super resolution system/method of FIG. 1 is indicated generally by the reference numeral 300. Decoded patch frames are subject to patch extraction and processing at step 310 (by a patch extractor and clusterer 351) to obtain processed patches. The processed patches are stored at step 315 (by a patch library 352). Decoded down-sized frames are subject to upsizing at step 320 (by an upsizer 353) to obtain upsized frames. The upsized frames are subject to patch searching and replacement at step 325 (by a patch searcher and replacer 354) to obtain replacement patches. The replacement patches are subject to post-processing at step 330 (by a post-processor 355) to obtain high resolution frames.

The key components of the example-based super resolution system/method relating to FIGS. 1-3 are patch clustering and patch replacement. The process has some commonalities with vector quantization based compression. When the system is applied to videos with static scenes, the videos can be very well recovered. However, if the input videos have motion, then jittering artifacts can be observed in the recovered videos. The artifacts are caused by the patch clustering and patch replacement processes. Turning to FIG. 4, quantization error caused by motion is indicated generally by the reference numeral 400. The quantization error an object (in motion) captured in six frames (designated as Frame 1 through Frame 6). The object (in motion) is indicated by the curved line in FIG. 4. The quantization error 400 is shown with respect to an upper portion, a middle portion, and a lower portion of FIG. 4. At the upper portion, co-located input patches 410 from consecutive frames of an input video sequence are shown. At the middle portion, representative patches 420 corresponding to clusters are shown. In particular, the middle portion shows a representative patch 421 of cluster 1, and a representative patch 422 of cluster 2. At the lower portion, patches 430 in the recovered video sequence are shown. The object motion in a video sequence results in a sequence of patches with shifted object edges. Since the patches in a sequence of consecutive frames look very similar, they are grouped into one cluster (or some other low number of clusters) and represented as a single representative patch (or some other low number of representative patches). We use the term "low" in the preceding sentence, since the number of clusters should clearly be less than the number of consecutive frames in a video sequence to be processed. During the recovery process, the corresponding low-resolution patches are replaced with the representative patches associated with the cluster. Since the patches with different spatial shifts are replaced with the same patch, the edges of the objects in the recovered video jump across frames, resulting in jittering artifacts.

We note that in addition to our aforementioned example-based super resolution method and apparatus, other example-based super resolution approaches also exist. Thus, regarding other example-based super resolution approaches, we note that the artifact problem of the patch-replacement process has not been addressed. One reason could be that example-based super resolution algorithm in accordance with a first prior art approach was developed for images rather than videos. Furthermore, since the system corresponding to the aforementioned first prior art approach as well as similar systems were developed for super resolution rather than compression, they do not have the clustering component, therefore the artifact problem of their systems may not be as serious as the example-based super resolution method for video data pruning described above with respect to FIGS. 1-3.

In sum, example-based super resolution for data pruning sends high-resolution (also referred to herein as "high-res") example patches and low-resolution (also referred to herein as "low-res") frames to the decoder. The decoder recovers the high-resolution frames by replacing the low-resolution patches with the example high-resolution patches (see FIG. 3). However, for videos with motion, the patch replacement process often results in jittering artifacts due to vector quantization (VQ) errors.

SUMMARY

These and other drawbacks and disadvantages of the prior art are addressed by the present principles, which are directed to methods and apparatus for reducing vector quantization error through patch shifting.

According to an aspect of the present principles, there is provided an apparatus. The apparatus includes a patch generator for generating, from an input video sequence, one of more high resolution replacement patches. The one or more high resolution replacement patches are for replacing one or more low resolution patches during a reconstruction of the input video sequence. The patch generator generates the one or more high resolution replacement patches using data corresponding to a patch spatial shifting process. The patch spatial shifting process is for reducing jittery artifacts caused by a motion-induced vector quantization error in the one or more high resolution replacement patches. The data is for at least deriving a patch size of the one or more high resolution replacement patches such that the one or more high resolution replacement patches are generated to have the patch size greater than a patch size of the one or more low resolution patches in order to be suitable for use in the patch spatial shifting process.

According to another aspect of the present principles, a method performed using a processor is provided. The method includes generating, from an input video sequence, one of more high resolution replacement patches. The one or more high resolution replacement patches are for replacing one or more low resolution patches during a reconstruction of the input video sequence. The generating step generates the one or more high resolution replacement patches using data corresponding to a patch spatial shifting process. The patch spatial shifting process is for reducing jittery artifacts caused by a motion-induced vector quantization error in the one or more high resolution replacement patches. The data is for at least deriving a patch size of the one or more high resolution replacement patches such that the one or more high resolution replacement patches are generated to have the patch size greater than a patch size of the one or more low resolution patches in order to be suitable for use in the patch spatial shifting process.

According to yet another aspect of the present principles, there is provided an apparatus. The apparatus includes a patch shifter for receiving one or more high resolution replacement patches having a motion-induced vector quantization error and at least spatially shifting the one or more high resolution replacement patches to reduce jittery artifacts caused by the motion-induced vector quantization error. The one or more high resolution replacement patches correspond to and are derived from an input video sequence. The apparatus further includes a picture reconstruction device in signal communication with the patch shifter for reconstructing the input video sequence using the one or more spatially shifted high resolution replacement patches and one or more down-sized pictures corresponding to and derived from the input video sequence.

According to still another aspect of the present principles, a method performed using a processor is provided. The method includes receiving one or more high resolution replacement patches having a motion-induced vector quantization error. The method further includes at least spatially shifting the one or more high resolution replacement patches to reduce jittery artifacts caused by the motion-induced vector quantization error. The one or more high resolution replacement patches correspond to and are derived from an input video sequence. The method also includes reconstructing the input video sequence using the one or more spatially shifted high resolution replacement patches and one or more down-sized pictures corresponding to and derived from the input video sequence.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
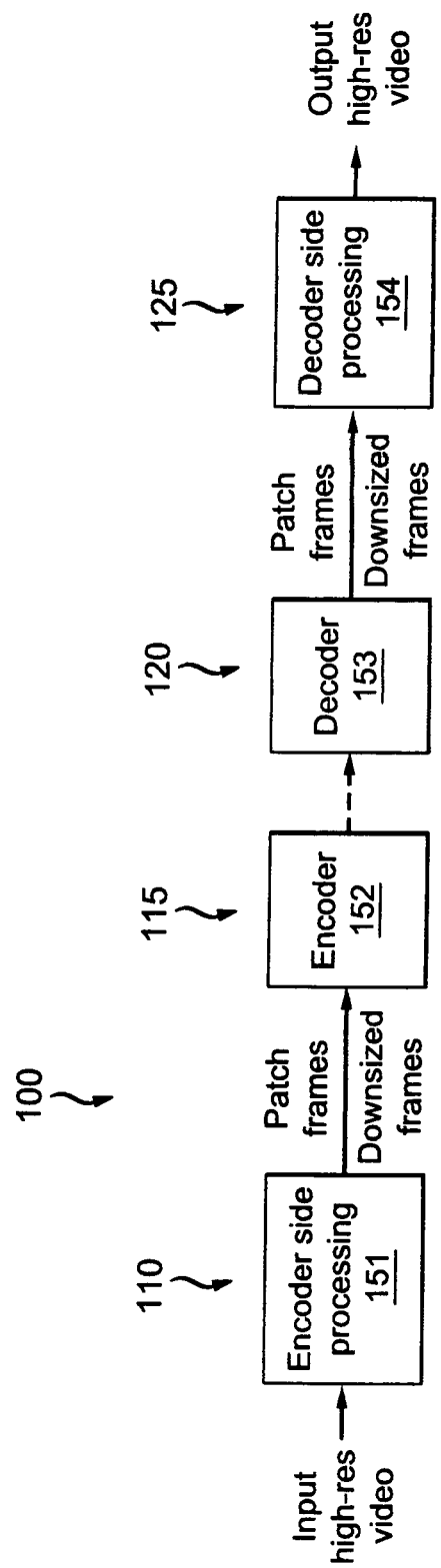
FIG. 1 is a high level block diagram showing an example-based super resolution system/method, in accordance with the prior art.

The present principles are directed to methods and apparatus for reducing vector quantization error through patch shifting.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Also, as used herein, the words "picture" and "image" are used interchangeably and generically refer to a still image or a picture from a video sequence. However, we note that prior approaches to example-based super resolution are directed to images and not to pictures from a video sequence. As is known, a picture may be a frame or a field.

Figure 5:
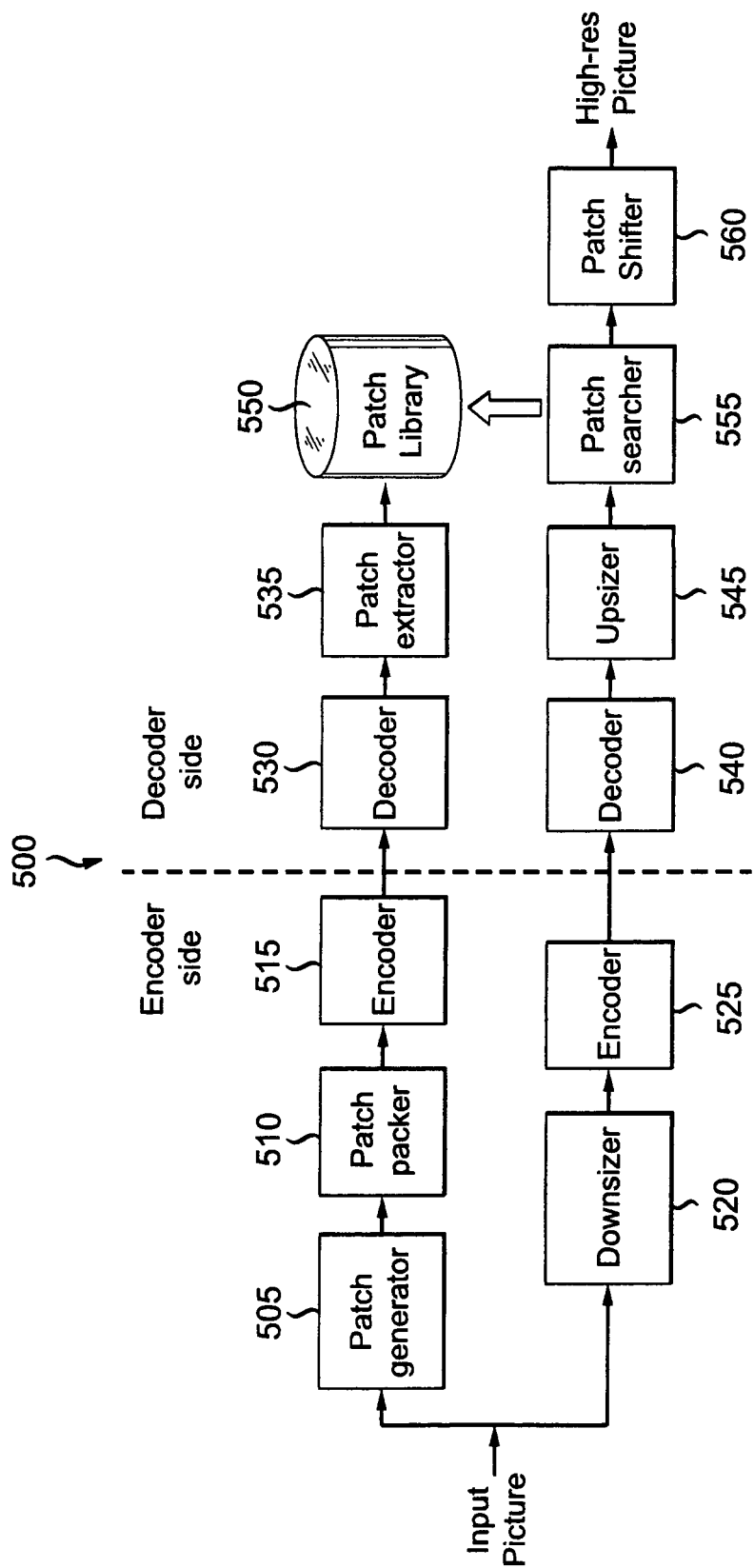
FIG. 5 is a block diagram showing an exemplary system for reducing vector quantization error through patch shifting, in accordance with an embodiment of the present principles.

Turning to FIG. 5, an exemplary system for reducing vector quantization error through patch shifting is indicated generally by the reference numeral 500. The system 500 includes a patch generator having an output in signal communication with an input of a patch packer 510. An output of the patch packer 510 is connected in signal communication with an input of an encoder 515. An output of the encoder is connected in signal communication with an input of a decoder 530. An output of the decoder 530 is connected in signal communication with an input of a patch extractor 535. An output of the patch extractor 535 is connected in signal communication with a first input of a patch library 550.

An output of a downsizer 520 is connected in signal communication with an input off an encoder 525. An output of the encoder 525 is connected in signal communication with an input of a decoder 540. An output of the decoder 540 is connected in signal communication with an input of an upsizer 545. An output of the upsizer 545 is connected in signal communication with an input of a patch searcher 555. A first output of the patch searcher 555 is connected in signal communication with an input of a patch shifter 560. A second output of the patch searcher 444 is connected in signal communication with a second input of the patch library 550.

An input of the patch generator 505 and an input of the downsizer 520 are available as input to the system 500, for receiving an input picture. An output of the patch shifter 560 is available as an output of the system 500, for outputting a high resolution picture.

It is to be appreciated that the connection between the encoder 515 and the decoder 530, as well as between the encoder 525 and the decoder 540, may be transitory, as need to communicate information from the encoders 515, 525 to the decoders 530, 540.

Also, it is to be appreciated that the patch generator 505, the patch packer 510, the encoder 515, the downsizer 520, and the encoder 525 pertain to an encoder side, while the decoder 530, the patch extractor 535, the patch library 550, the decoder 540, the upsizer 545, the patch searcher 555, and the patch shifter 560 pertain to a decoder side.

Further, it is to be appreciated that the patch shifter 560 may be considered to include a picture reconstruction device where, in an embodiment, the patch shifter receives one or more high resolution replacement patches having a motion-induced vector quantization error and at least spatially shifts the one or more high resolution replacement patches to reduce jittery artifacts caused by the motion-induced vector quantization error. The one or more high resolution replacement patches correspond to and are derived from an input video sequence. A picture reconstruction device, presumed to be included in the patch shifter in an embodiment, reconstructs the input video sequence using the one or more spatially shifted high resolution replacement patches and one or more down-sized pictures corresponding to and derived from the input video sequence.

The patch generator 505 clusters extracted patches and generates representative patches. The patch packer 510 packs the representative patches into patch frames. The video encoders 515 and 525 respectively encode the patch frames (provided by the patch packer 510) and downsized frames (provided by the downsizer 520). The downsizer 520 down-sizes the original picture to a smaller size for sending to the decoder side. The video decoders 530 and 540 respectively decode the (encoded) patch frames and the (encoded) down-sized frames. The patch extractor 535 extracts patches from the patch frames. The upsizer 545 upscales the decoded downsized picture. The patch searcher 555 searches the patches in the patch library and replaces the blocks in the picture with the found patches. The patch shifter 560 shifts the patches to correct a vector quantization error.

Figure 6:
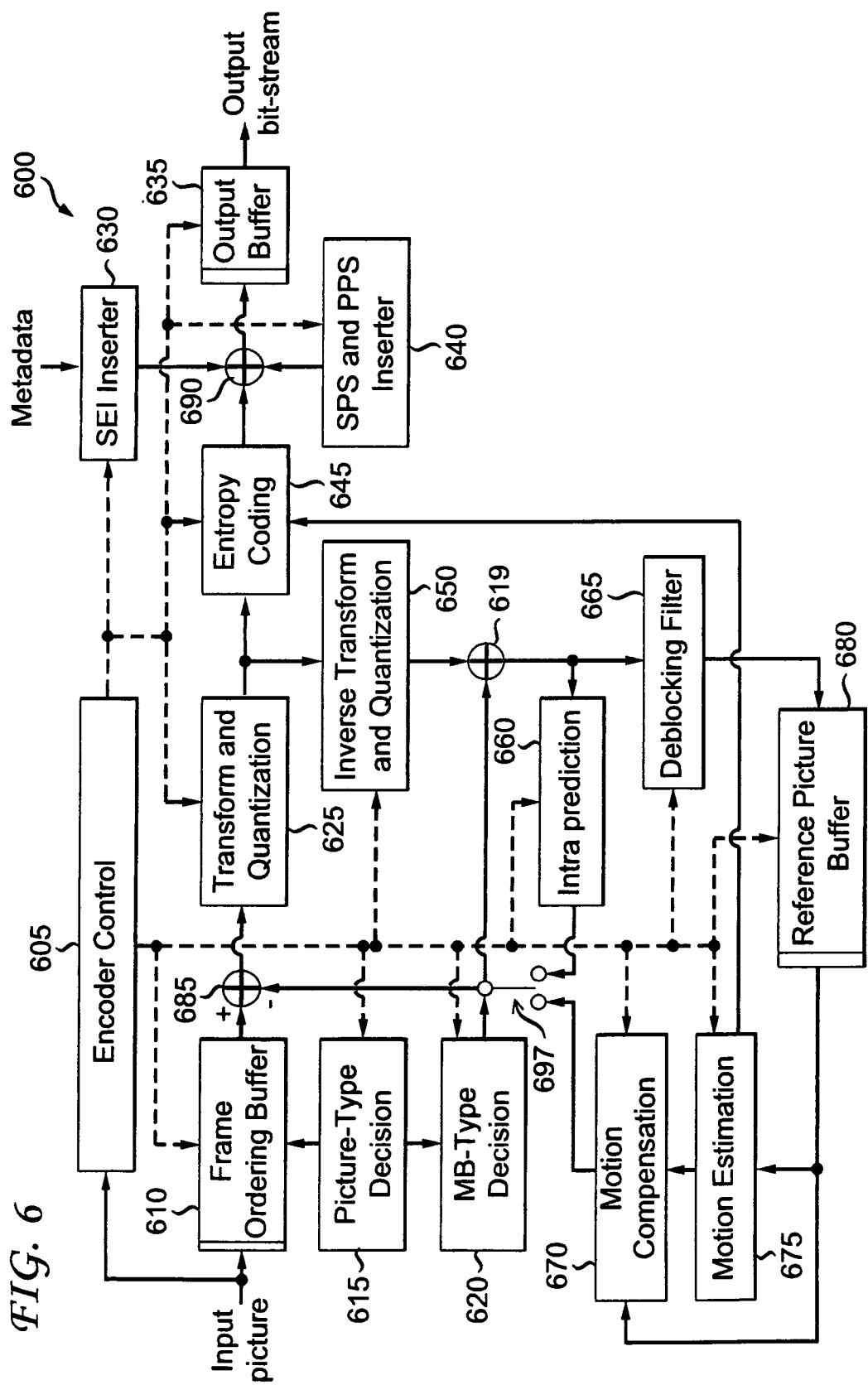
FIG. 6 is a block diagram showing an exemplary video encoder to which the present principles may be applied, in accordance with an embodiment of the present principles.

Turning to FIG. 6, an exemplary video encoder to which the present principles may be applied is indicated generally by the reference numeral 600. The video encoder 600 includes a frame ordering buffer 610 having an output in signal communication with a non-inverting input of a combiner 685. An output of the combiner 685 is connected in signal communication with a first input of a transformer and quantizer 625. An output of the transformer and quantizer 625 is connected in signal communication with a first input of an entropy coder 645 and a first input of an inverse transformer and inverse quantizer 650. An output of the entropy coder 645 is connected in signal communication with a first non-inverting input of a combiner 690. An output of the combiner 690 is connected in signal communication with a first input of an output buffer 635.

A first output of an encoder controller 605 is connected in signal communication with a second input of the frame ordering buffer 610, a second input of the inverse transformer and inverse quantizer 650, an input of a picture-type decision module 615, a first input of a macroblock-type (MB-type) decision module 620, a second input of an intra prediction module 660, a second input of a deblocking filter 665, a first input of a motion compensator 670, a first input of a motion estimator 675, and a second input of a reference picture buffer 680.

A second output of the encoder controller 605 is connected in signal communication with a first input of a Supplemental Enhancement Information (SEI) inserter 630, a second input of the transformer and quantizer 625, a second input of the entropy coder 645, a second input of the output buffer 635, and an input of the Sequence Parameter Set (SPS) and Picture Parameter Set (PPS) inserter 640.

An output of the SEI inserter 630 is connected in signal communication with a second non-inverting input of the combiner 690.

A first output of the picture-type decision module 615 is connected in signal communication with a third input of the frame ordering buffer 610. A second output of the picture-type decision module 615 is connected in signal communication with a second input of a macroblock-type decision module 620.

An output of the Sequence Parameter Set (SPS) and Picture Parameter Set (PPS) inserter 640 is connected in signal communication with a third non-inverting input of the combiner 690.

An output of the inverse quantizer and inverse transformer 650 is connected in signal communication with a first non-inverting input of a combiner 619. An output of the combiner 619 is connected in signal communication with a first input of the intra prediction module 660 and a first input of the deblocking filter 665. An output of the deblocking filter 665 is connected in signal communication with a first input of a reference picture buffer 680. An output of the reference picture buffer 680 is connected in signal communication with a second input of the motion estimator 675 and a third input of the motion compensator 670. A first output of the motion estimator 675 is connected in signal communication with a second input of the motion compensator 670. A second output of the motion estimator 675 is connected in signal communication with a third input of the entropy coder 645.

An output of the motion compensator 670 is connected in signal communication with a first input of a switch 697. An output of the intra prediction module 660 is connected in signal communication with a second input of the switch 697. An output of the macroblock-type decision module 620 is connected in signal communication with a third input of the switch 697. The third input of the switch 697 determines whether or not the "data" input of the switch (as compared to the control input, i.e., the third input) is to be provided by the motion compensator 670 or the intra prediction module 660. The output of the switch 697 is connected in signal communication with a second non-inverting input of the combiner 619 and an inverting input of the combiner 685.

A first input of the frame ordering buffer 610 and an input of the encoder controller 605 are available as inputs of the encoder 600, for receiving an input picture. Moreover, a second input of the Supplemental Enhancement Information (SEI) inserter 630 is available as an input of the encoder 600, for receiving metadata. An output of the output buffer 635 is available as an output of the encoder 100, for outputting a bitstream.

It is to be appreciated that one or more of encoders 515 and 525 from FIG. 5 may be implemented as encoder 600.

Figure 7:
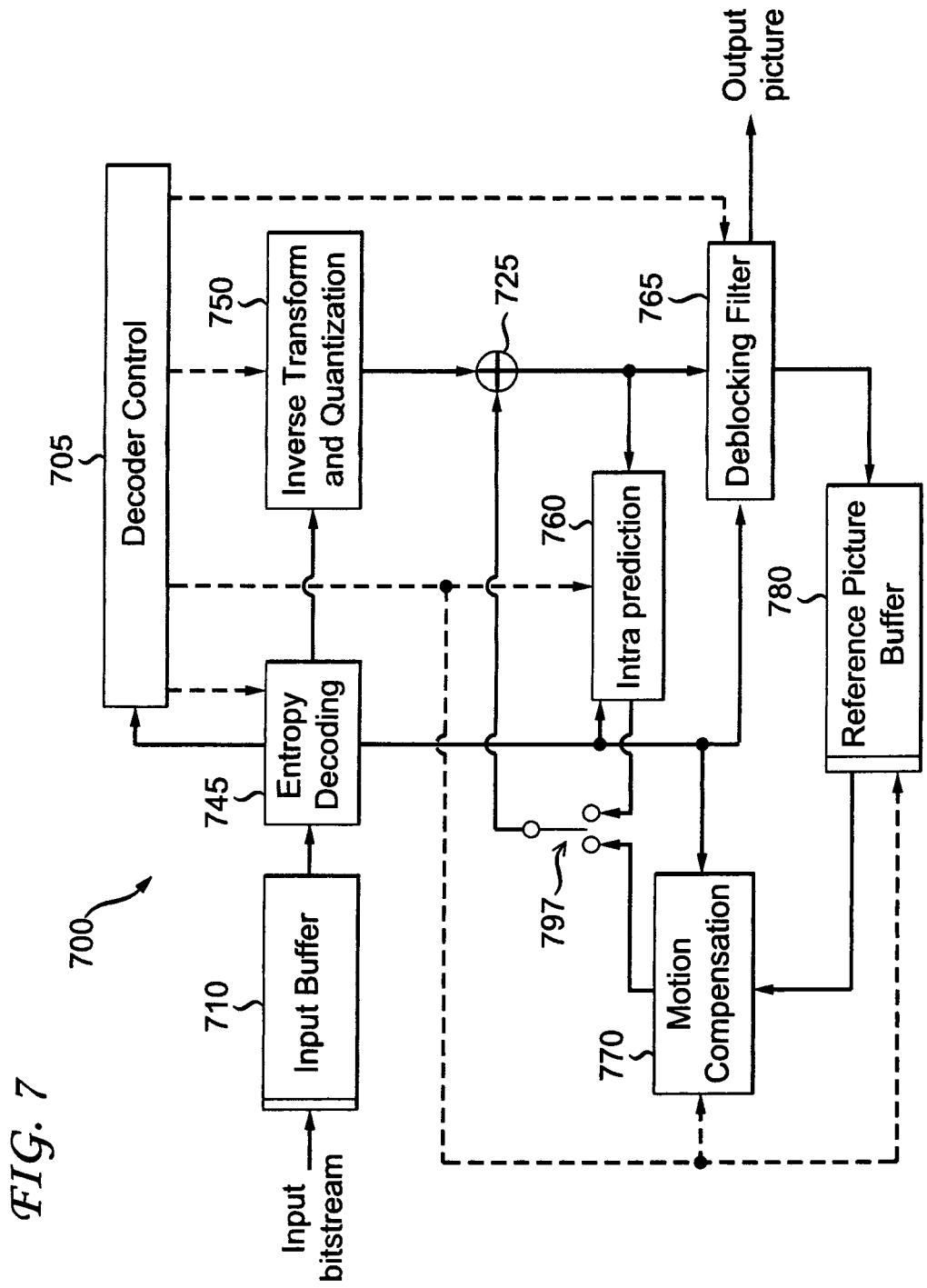
FIG. 7 is a block diagram showing an exemplary video decoder to which the present principles may be applied, in accordance with an embodiment of the present principles.

Turning to FIG. 7, an exemplary video decoder to which the present principles may be applied is indicated generally by the reference numeral 700. The video decoder 700 includes an input buffer 710 having an output connected in signal communication with a first input of an entropy decoder 745. A first output of the entropy decoder 745 is connected in signal communication with a first input of an inverse transformer and inverse quantizer 750. An output of the inverse transformer and inverse quantizer 750 is connected in signal communication with a second non-inverting input of a combiner 725. An output of the combiner 725 is connected in signal communication with a second input of a deblocking filter 765 and a first input of an intra prediction module 760. A second output of the deblocking filter 765 is connected in signal communication with a first input of a reference picture buffer 780. An output of the reference picture buffer 780 is connected in signal communication with a second input of a motion compensator 770.

A second output of the entropy decoder 745 is connected in signal communication with a third input of the motion compensator 770, a first input of the deblocking filter 765, and a third input of the intra predictor 760. A third output of the entropy decoder 745 is connected in signal communication with an input of a decoder controller 705. A first output of the decoder controller 705 is connected in signal communication with a second input of the entropy decoder 745. A second output of the decoder controller 705 is connected in signal communication with a second input of the inverse transformer and inverse quantizer 750. A third output of the decoder controller 705 is connected in signal communication with a third input of the deblocking filter 765. A fourth output of the decoder controller 705 is connected in signal communication with a second input of the intra prediction module 760, a first input of the motion compensator 770, and a second input of the reference picture buffer 780.

An output of the motion compensator 770 is connected in signal communication with a first input of a switch 797. An output of the intra prediction module 760 is connected in signal communication with a second input of the switch 797. An output of the switch 797 is connected in signal communication with a first non-inverting input of the combiner 725.

An input of the input buffer 710 is available as an input of the decoder 700, for receiving an input bitstream. A first output of the deblocking filter 765 is available as an output of the decoder 700, for outputting an output picture.

It is to be appreciated that one or more of decoders 530 and 540 from FIG. 5 may be implemented as decoder 700.

As noted above, the present principles are directed to methods and apparatus for reducing vector quantization error through patch shifting. In further detail, in at least one embodiment, we reduce the jittering artifacts caused by vector quantization errors by shifting the replacement high-resolution patches and enforcing the spatiotemporal smoothness of the recovered high-resolution video.

Figure 2:
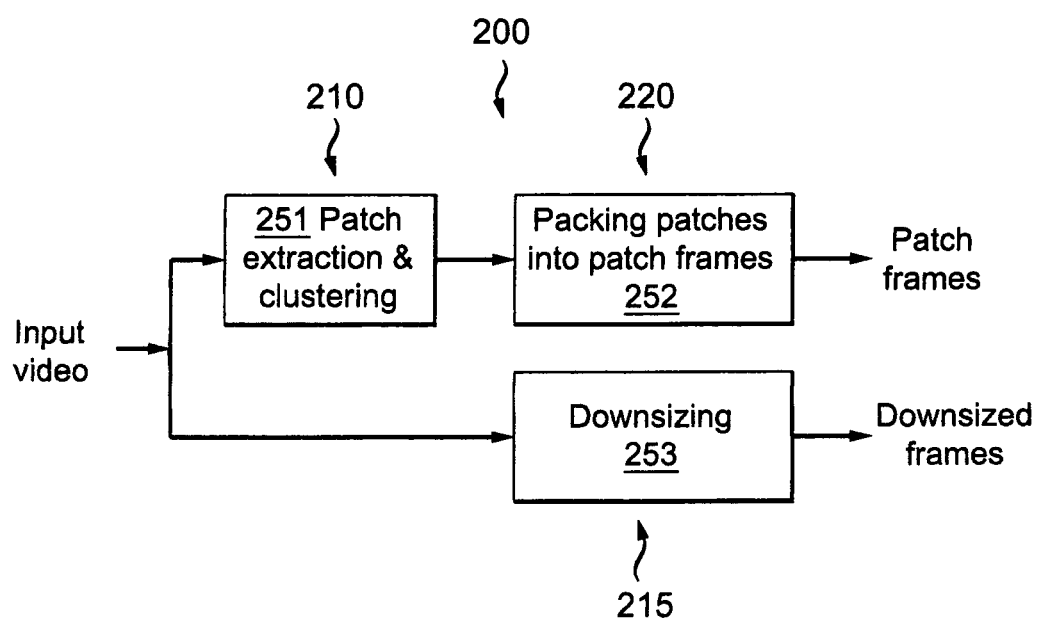
FIG. 2 is a high level block diagram showing the encoder side pre-processing corresponding to the example-based super resolution system/method of FIG. 1, in accordance with the prior art.

Although the method has been developed specifically for our super resolution based data pruning framework (e.g., as described above with respect to FIGS. 1-3), the algorithm is applicable for all systems involving vector quantization, and patch replacement. For example, present principles may be applied to example-based image super resolution in the aforementioned first prior art approach (and similar approaches), as well as video epitome and traditional vector quantization based image/video compression systems. Epitome based approaches divide an image (or video) into patches, and represent an image as a small miniature containing representative patches and a subjective map that maps the patches in the image to those in the epitome miniature. The small miniature (i.e., epitome) can be deemed as a compressed version of the original image or video, therefore epitome can be potentially used for compression purposes.

For the sake of generality, we focus on an abstract system that includes the following two components: (1) example (or representative) patch generation; and (2) patch replacement.

In different applications, such a paradigm may have variations. For example, in the aforementioned first prior art approach, the example patch generation is realized by collecting patches from an image database without clustering. In our example-based super resolution method (as well in some other vector quantization based compression schemes), the example (or representative) patches are generated by clustering the patches extracted from input videos/images.

Figure 13:
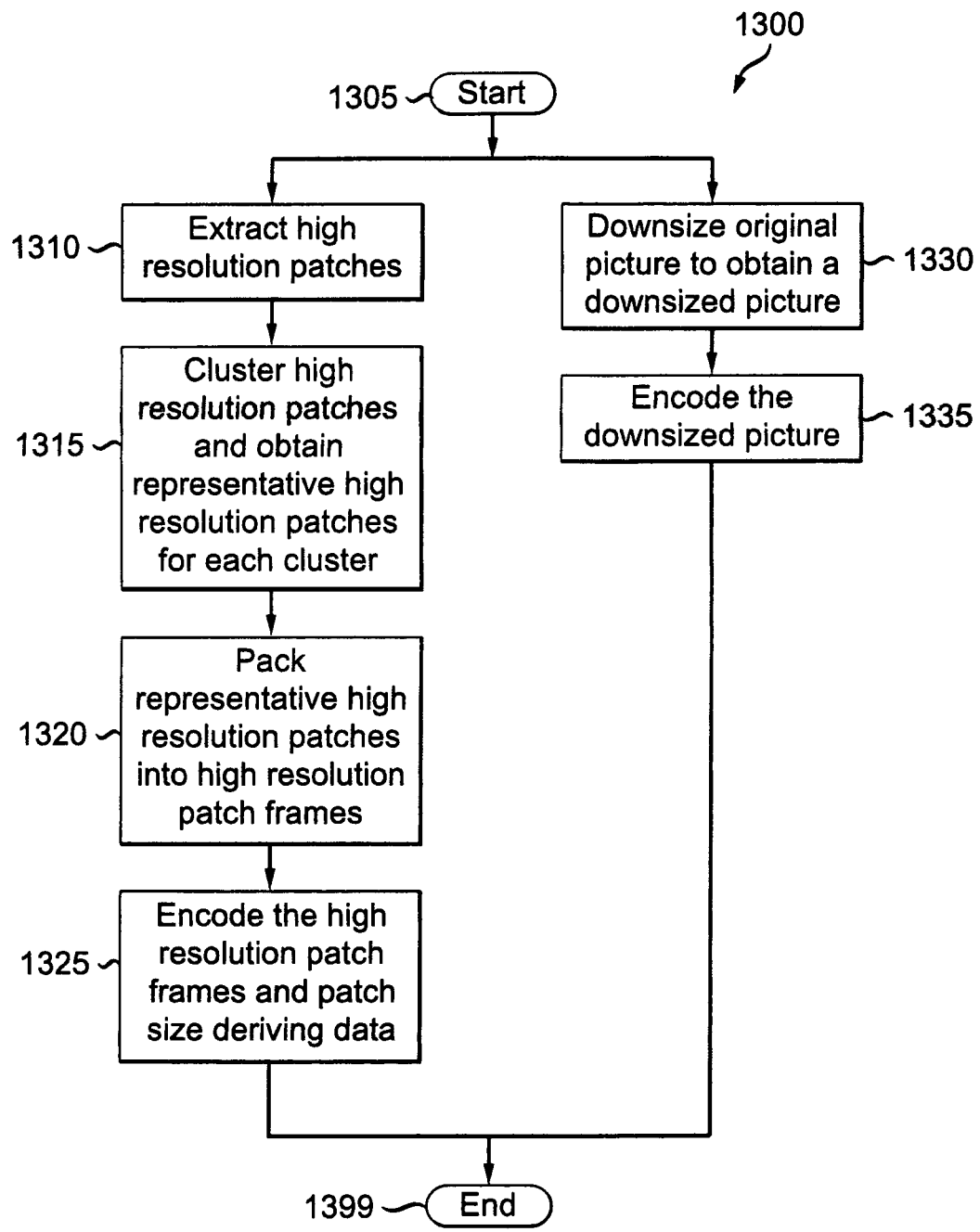
FIG. 13 is a flow diagram showing an exemplary method for reducing vector quantization error through patch shifting, in accordance with an embodiment of the present principles.

Turning to FIG. 13, an exemplary method for reducing vector quantization error through patch shifting is indicated generally by the reference numeral 1300. The method 1300 corresponds to the functions performed on the encoder side shown in FIG. 5. The method 1300 includes a start block 1305 that passes control to a function block 1310 and a function block 1330. The function block 1310 extracts high resolution patches, and passes control to a function block 1315. The function block 1315 clusters high resolution patches, obtains representative high resolution patches for each cluster, and passes control to a function block 1320. The function block 1320 packs the representative high resolution patches into high resolution frames, and passes control to a function block 1325. The function block 1325 encodes the high resolution patch frames and patch size deriving data, and passes control to an end block 1399. The function block 1330 downsizes an original picture to obtain a downsized picture, and passes control to a function block 1335. The function block 1335 encodes the downsized picture, and passes control to an end block 1399.

Figure 14:
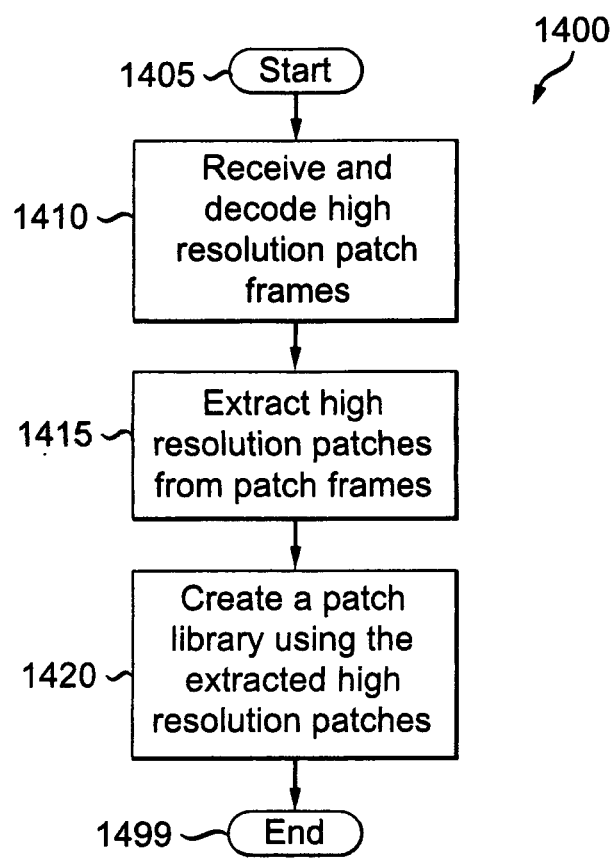
FIG. 14 is a flow diagram showing an exemplary method for generating a patch library, in accordance with an embodiment of the present principles.

Turning to FIG. 14, an exemplary method for generating a patch library is indicated generally by the reference numeral 1400. The method 1400 includes a start block 1405 that passes control to a function block 1410. The function block 1410 receives and decodes high resolution patch frames, and passes control to a function block 1415. The function block 1415 extracts high resolution patches from patch frames, and passes control to a function block 1420. The function block 1420 creates a patch library using the extracted high resolution patches, and passes control to an end block 1499.

Figure 15:
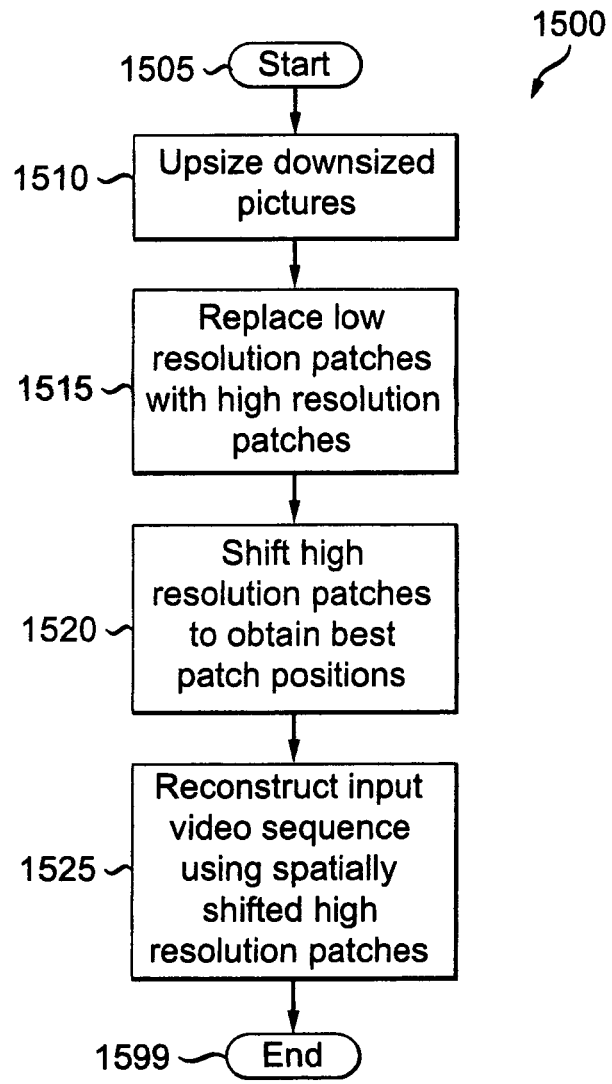
FIG. 15 is a flow diagram showing another exemplary method for reducing vector quantization error through patch shifting, in accordance with an embodiment of the present principles.

Turning to FIG. 15, another exemplary method for reducing vector quantization error through patch shifting is indicated generally by the reference numeral 1500. The method 1500 corresponds to the functions performed on the decoder side shown in FIG. 5. The method 1500 includes a start block 1505 that passes control to a function block 1510. The function block 1510 upsizes downsized pictures, and passes control to a function block 1515. The function block 1515 replaces low resolution patches with high resolution patches, and passes control to a function block 1520. The function block 1520 spatially shifts high resolution patches to obtain best patch position, and passes control to a function block 1525. The function block 1525 reconstructs the input video sequence using the spatially shifted high resolution patches, and passes control to an end block 1599.

Patch Shifting to Reduce Artifacts

Figure 4:
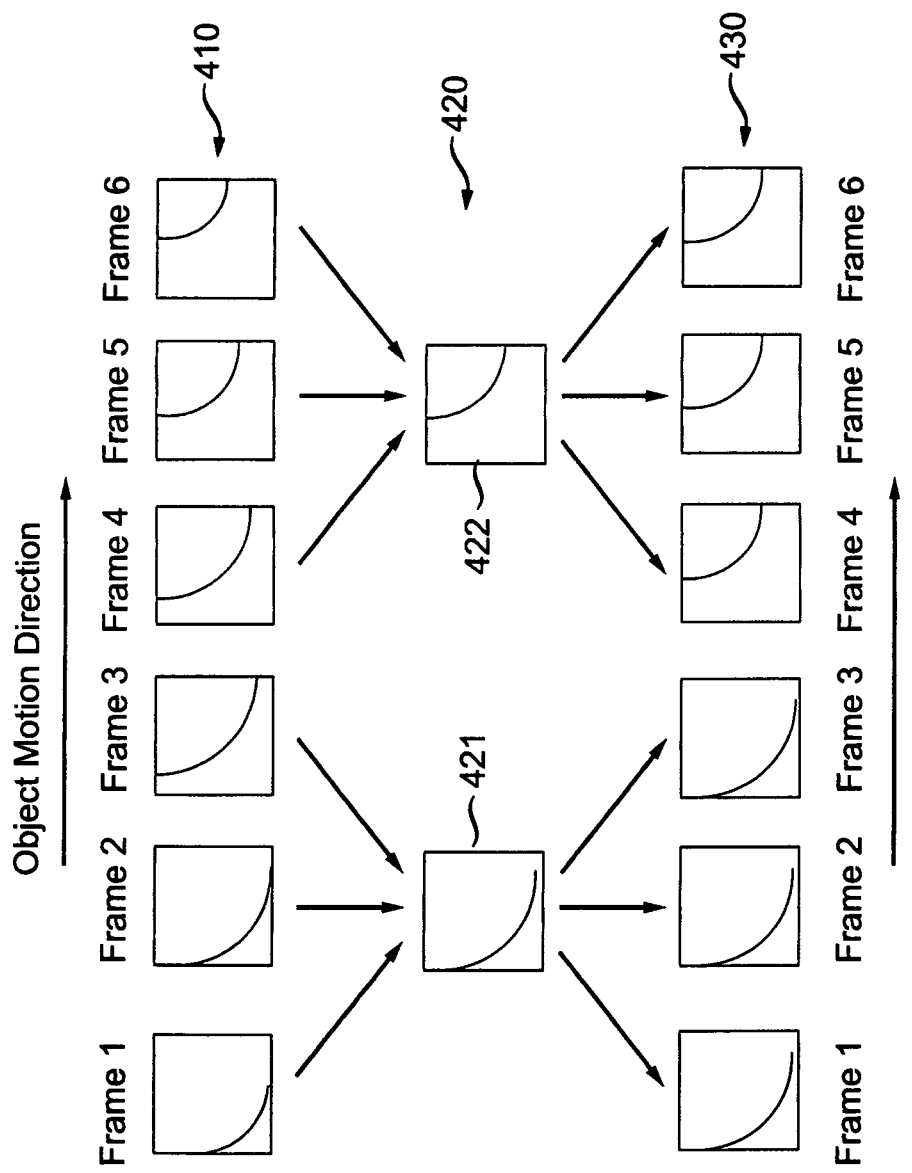
FIG. 4 is a diagram showing quantization error caused by motion, to which the present principles may be applied.

If the example patch generation component includes a clustering process, the clustering process results in vector quantization errors. There could be different types of quantization errors. One type of quantization error is caused by motion, as illustrated in FIG. 4.

In accordance with the present principles, we solve the quantization error resulting from motion by shifting the example (representative) patches during the recovery process.

Patch Shifting

Figure 8:
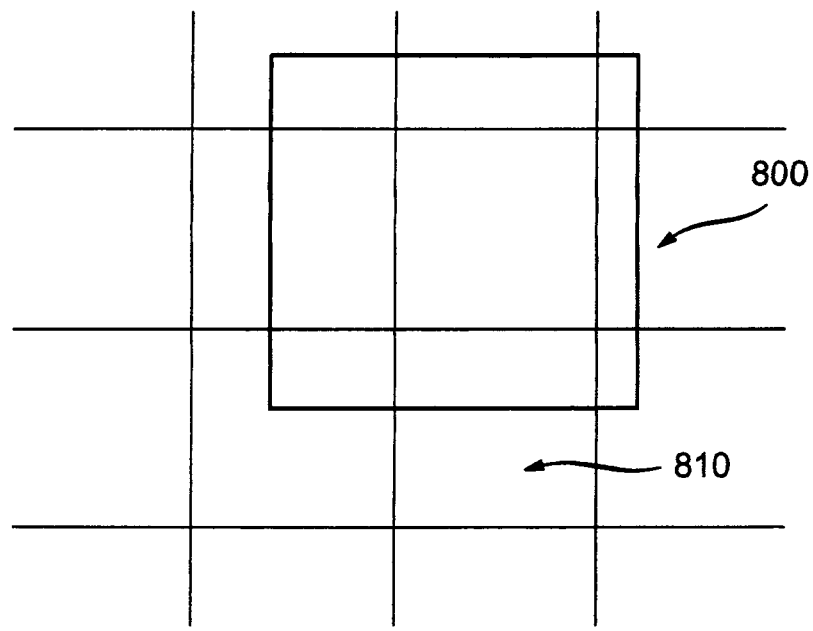
FIG. 8 is a block diagram showing an extended patch, in accordance with an embodiment of the present principles.

In the case of example-based super resolution, in order to shift the high-resolution patches without creating holes in the recovered image or video frames, the example patches generated during clustering have to be larger than the patches in the low-resolution frames for replacement. For example, if the size of the low resolution patches in the frames is N×N pixels, then the size of the representative patch has to be M×M where M>N. The maximum patch shift in one dimension is therefore M-N. Turning to FIG. 8, an extended patch is indicated generally by the reference numeral 800. Also shown is a low resolution patch 810 in a frame for replacement. As can be seen, the extended patch 800 extends into other "frame regions".

In our current example-based super resolution system, the clustering process is performed on a set of patches with an N×N pixel size. However, after the clustering process is done, the representative patches are generated by averaging the corresponding extended patches with the M×M pixel size. The extended patches are the patches used for clustering with an additional boundary extension (M-N pixel in each dimension). For the patches at the border, the extended patches are created by padding additional pixels to the area outside the frame. Different padding strategies can be used, for example, padding with black pixels, duplicating pixels at the border, and so forth.

Figure 3:
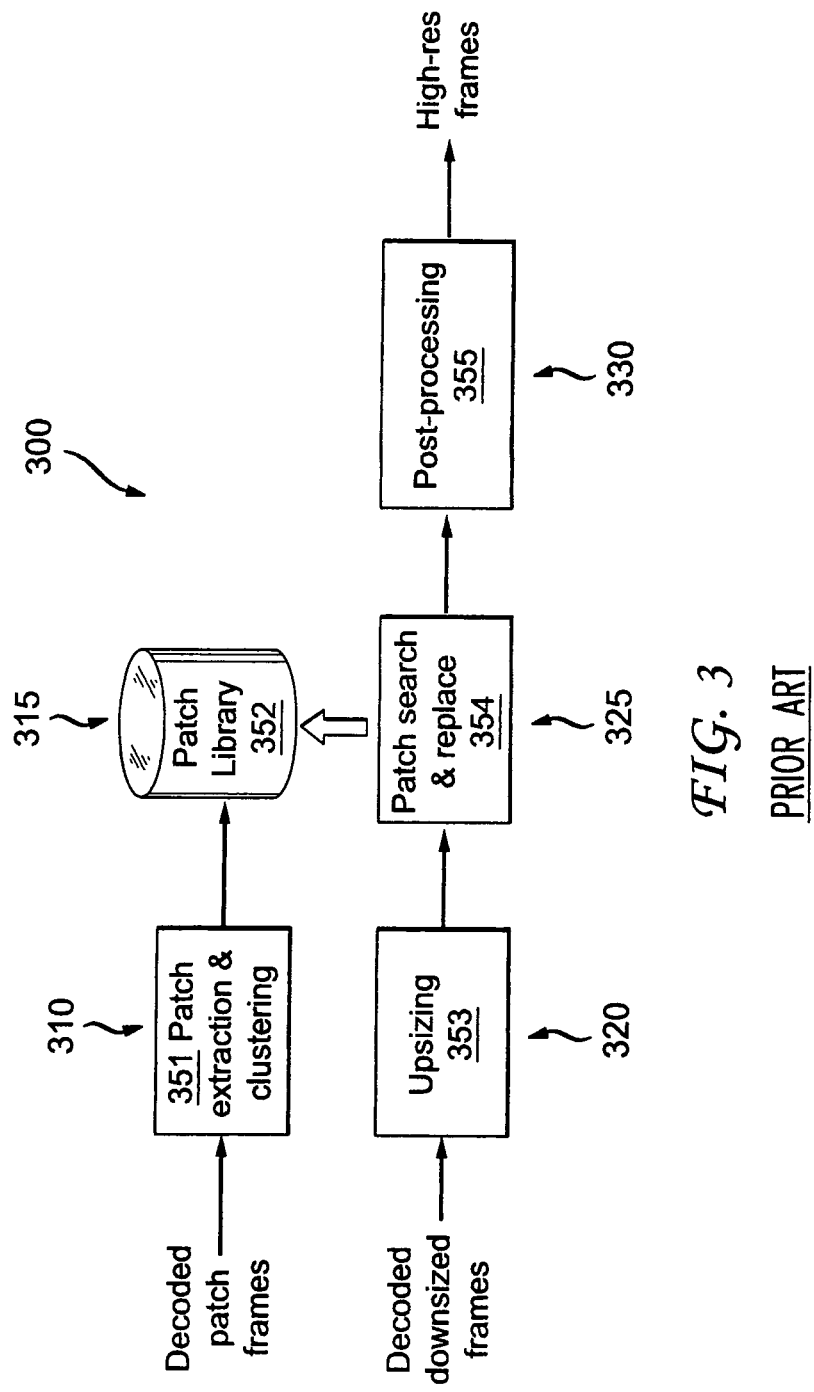
FIG. 3 is a high level block diagram showing the decoder side post-processing corresponding to the example-based super resolution system/method of FIG. 1, in accordance with the prior art.

At the decoder side, before the patch replacement and shifting process, the regular representative patches (N×N pixel block) for the patch matching purpose are created from the extended patches by cropping. During the frame recovery process, the low-resolution patch at a given patch position in the low-resolution image is matched to the regular representative patches (N×N pixel blocks) in the library. The patch in the library with the minimum distance is selected as a candidate. The patch shifting process using the extended example patch (e.g., of FIG. 8) is then applied to find the shift coordinate that results in the minimum distance between the exposed portion (i.e., the portion that will replace the low-resolution patch) of the extended example patch and the low-resolution patch for replacement (FIG. 3). This is essentially a two-stage process including patch finding and patch shifting. These steps can be combined such that for every patch matching step, patch shifting is also applied, so that the best patch candidate and the best patch shift coordinate can be obtained at the same time. However, such a joint process is much more costly in computation.

For vector quantization compression applications, there are no low-resolution images and low-resolution patches that can be used for aligning the patches. However, patch shifting can be still achieved by enforcing spatiotemporal smoothness as described herein after.

Enforcing Spatiotemporal Smoothness

Hereinbefore, patch shifting is realized by a simple matching process without considering spatial and temporal constraints. As a result, artifacts could still been seen after recovery because spatiotemporal consistency is not enforced.

In our current system, spatiotemporal constraints are enforced by minimizing a cost function whose variables are shift coordinates of the extended patches. Concretely, for the $i^{th}$ extended patch $P_i$, the shift coordinate is $S_i=(x_i, y_i)$, where $x_i$ is the horizontal shift measured by pixel, and $y_i$ is the vertical shift. If only spatial constraints are considered, we can construct a cost function as follows:

$$\text{Cost}(S_1, S_2, \ldots, S_N) = \sum_i C1(S_i) + \lambda \sum_i C2(S_i) \quad (2)$$

where $S_i$ is the shift coordinate of the $i^{th}$ patch, $\lambda$ is a weighting factor, and C1 is the cost function measuring the difference between the shifted patch and the template patch (wherein the template patch is a low-resolution patch in the case of example-based super resolution). If the template patch is $M_i$, and the shifted and cropped patch is $T(P_i|S_i)$, where $T(.)$ is a transformation to shift, crop and downscale the extended patch to match the size of $M_i$ according to the shift coordinate $S_i$, then C1 is defined as $C1(S_i)=\|M_i-T(P_i|S_i)\|^2$. C2 is defined using the boundary pixels of the $i^{th}$ patch. Let the boundary area be denoted as $\Omega$. Then $C2(S_i)=\|T(P_i|S_i)-I\|_\Omega^2$, where $\|\cdot\|_\Omega^2$ represents a distance calculation restricted within the boundary area $\Omega$. I is the recovered video frame from the last iteration. It is to be appreciated that other alternative cost functions for C2 can be also used, for example, cost functions using image gradients rather than pixels to compute the patch difference. The algorithm is an iterative process started with the initial values of $S_1, S_2, \ldots, S_M$ by minimizing the cost function in Equation (2) with the C1 cost function only. For the following iterations, the C2 function is used.

Figure 9:
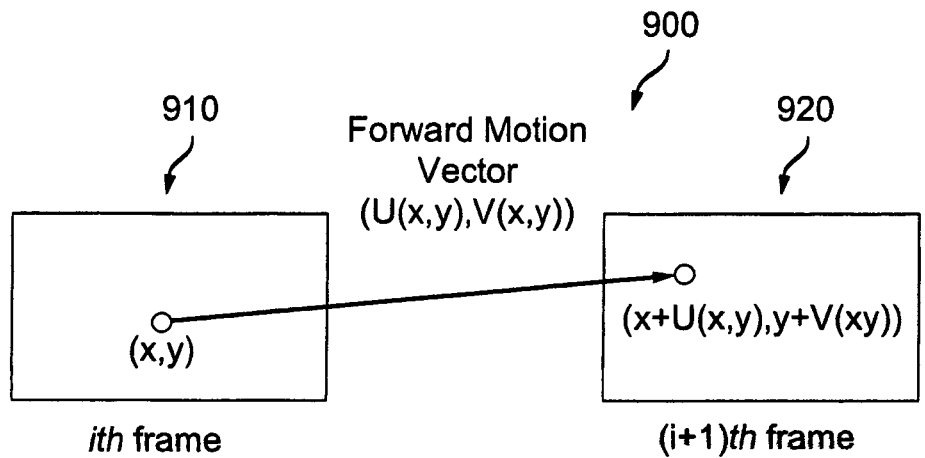
FIG. 9 is a diagram showing a forward motion vector to which the present principles may be applied, in accordance with an embodiment of the present principles.
Figure 10:
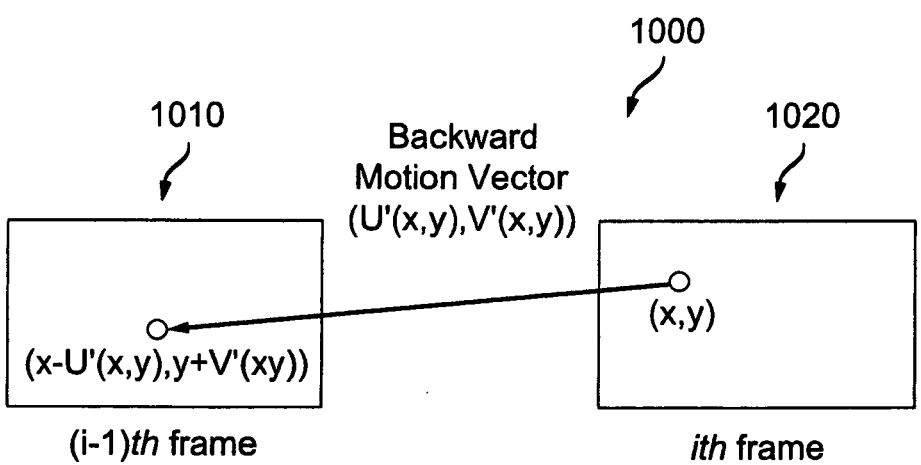
FIG. 10 is a diagram showing a backward motion vector to which the present principles may be applied, in accordance with an embodiment of the present principles.

The above construction does not take into account temporal consistency. If temporal consistency is considered, then the motion vector fields have to be calculated before patch shifting. In our current system, we calculate both forward and backward motion vectors for each patch position. The forward motion vector is the displacement of a patch in the current frame compared to the corresponding patch in the next frame (see FIG. 9). The backward motion vector is the displacement of a patch in the current frame compared to the corresponding patch in the previous frame (FIG. 10). Turning to FIG. 9, a forward motion vector is indicated generally by the reference numeral 900. The forward motion vector 900 corresponds to an $i^{th}$ frame 910 and an $(I+1)^{th}$ frame 920. Turning to FIG. 10, a backward motion vector is indicated generally by the reference numeral 1000. The backward motion vector 1000 corresponds to an (i-1)th frame 1010 and the ith frame 910.

Taking into account the temporal consistency, the cost function then becomes as follows:

$$\text{Cost}(S_1, S_2, \ldots, S_N) = \sum_i C1(S_i) + \lambda \sum_i C2(S_i) + \mu \sum_i C3(S_i) \quad (3)$$

where C3 is a cost function for enforcing temporal consistency as follows:

$$C3(S_i) = \frac{1}{2}\left(\|T(P_i|S_i) - F(M_i)\|^2 + \|T(P_i|S_i) - B(M_i)\|^2\right) \quad (4)$$

where $F(M_i)$ is the patch in the next frame that corresponds to the patch $M_i$ according to its forward motion vector. If the coordinate of the upper left corner of the patch $M_i$ is (x,y), then the coordinate of the upper left corner of the corresponding patch in the next video frame should be (x+U(x,y),y+V(x,y)) (FIG. 9). Likewise $B(M_i)$ is the patch in the previous frame that corresponds to the patch $M_i$ according to its backward motion vector.

The cost function of Equation (3) actually defines a Markov Random Field (MRF) on the patches, in that the shift coordinate $S_i$ of an extended patch only depends on the template (the $i^{th}$ low resolution patch) and its neighboring area (the boundary pixels of the $i^{th}$ patch). The minimization of the Markov Random Field can be realized by various approaches including, but not limited to, for example, gradient descent, belief propagation, Monte Carlo, and so forth. In our current system, the gradient descent approach is used because it is efficient and provides satisfactory results. The minimization procedure is an iterative process as follows (FIG. 11):

1. Initialize the shift coordinates of all patches in all frames by shifting patches without spatiotemporal constraints. This is equivalent to minimizing the cost function of Equation (3) without the C2 and C3 terms.
2. For each frame, minimize the cost function of Equation (3) with the C2 and C3 terms. Afterwards, recover the high-resolution frame using the selected patches and shift coordinates.
3. If the stop condition is met, exit the algorithm. Otherwise, go back to step 2.

Various stop conditions can be used. One possible choice is to let the algorithm stop when the difference between the total cost of the last iteration and current iteration is less than a certain threshold.

We note that while in one embodiment of the present principles, the optimization framework of our proposed method is based on Markov Random Field (MRF). We further note that while the aforementioned first prior art approach has used a MRF framework to optimize the selection of patches, we use MRF to shift the patches to minimize the artifacts caused by vector quantization errors.

Figure 11:
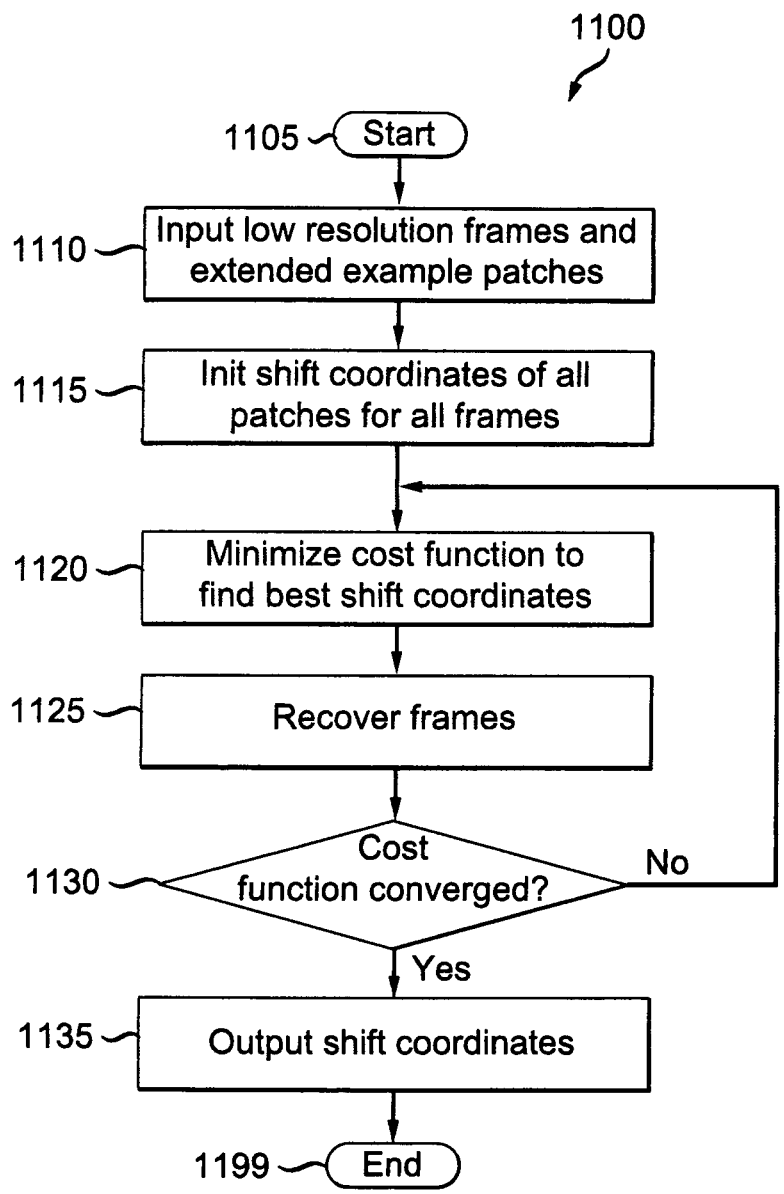
FIG. 11 is a flow diagram showing an exemplary method for patching shifting, in accordance with an embodiment of the present principles.

Turning to FIG. 11, an exemplary method for patching shifting is indicated generally by the reference numeral 1100. The method 1100 includes a start block 1105 that passes control to a function block 1110. The function block 1110 inputs low-resolution frames and extended example patches, and passes control to a function block 1115. The function block 1115 initializes shift coordinates of all patches for all frames, and passes control to a function block 1120. The function block 1120 minimizes a cost function to find the best shift coordinates, and passes control to a function block 1125. The function block 1125 recovers high resolution frames using the patches and the best shift coordinates, and passes control to a decision block 1130. The decision block 1130 determines whether or not the cost function has converged. If so, then control is passed to a function block 1135. Otherwise, control is returned to the function block 1120. The function block 1135 outputs the best shift coordinates, and passes control to an end block 1199.

Sub-Pixel Patch Shifting

If the object or background motion is very small, then we will still see jittering artifacts even if the above mentioned spatiotemporal constraints are used. Sub-pixel patch shifting is used to make the patch alignment more accurate. The algorithm using sub-pixel patch shifting is approximately the same as the one described above regarding enforcing spatiotemporal smoothness. The difference is that the shift coordinates take fractional values, for example ½ pixel, ⅓ pixel, and so forth.

Using sub-pixel patch shifting means that there will be more state numbers (i.e., the size of the space of the shift coordinates) for the MRF cost function of Equation (3), therefore sub-pixel patch shifting is more complex than regular patch shifting. One way to reduce the computational complexity is to use a hierarchical matching scheme as follows: we first use a pixel patch shifting scheme to approximately determine the position of a patch; and then a sub-pixel patch shifting is followed with a narrow range to refine the patch position.

Generating Better Representative Patches

Thus far, patch shifting is only applied during the video recovery stage. However, patch shifting can be also used for generating better representative patches during the clustering process.

The representative patches are usually generated during clustering by averaging all the patches in a cluster. The averaging process in general will result in lower resolution of the patch images if the object edges within the patches are not aligned before averaging. Patch shifting therefore can be applied before the averaging process to align the patches so that the object edges can be better preserved. For each cluster, the alignment can be realized by the following iterative procedure:

1. Average all patches in a cluster to obtain the initial representative patch of the cluster.
2. Align each patch in the cluster to the representative patch by matching each given one of the patches in the cluster with the representative patch to minimize the total difference (e.g., using the Euclidean distance, and so forth).
3. If all patches have zero shift, then the algorithm stops and outputs the representative patch. Otherwise, the representative patch is recalculated by averaging the shifted patches, and a return is made back to step 2.

Apart from the above mentioned approach, generating better representative patches can be also realized by other approaches such as, for example in a first exemplary approach and a second exemplary approach. In the first exemplary approach, rather than averaging the patches in the cluster, we can choose one of the patches from the cluster which has the minimum distance from the averaged patch. In the second exemplary approach, rather than averaging all of the patches in the cluster, we can use only some of the patches in the cluster to perform averaging, while leaving out the outlier patches that deviate too far away from the cluster center (i.e., the averaged patch).

Extending to More General Patch Transformation

Patch shifting is a special case of general patch geometric transformations. The idea of patch shifting therefore can be generalized to more generic transformations that accommodate more general geometric transformations including, but not limited to, zoom in/out, rotation, projective transform, and so forth. The algorithm incorporating these transformations is similar to the algorithm provided hereinabove regarding enforcing spatiotemporal smoothness by replacing the shift coordinates with more general transformation parameters. Examples of such parameters include, but are not limited to, translation parameters, rotation parameters, perspective parameters, and so forth. However, the main issue of general patch transformation is that the computation complexity could be much higher than that of patch shifting.

Figure 12:
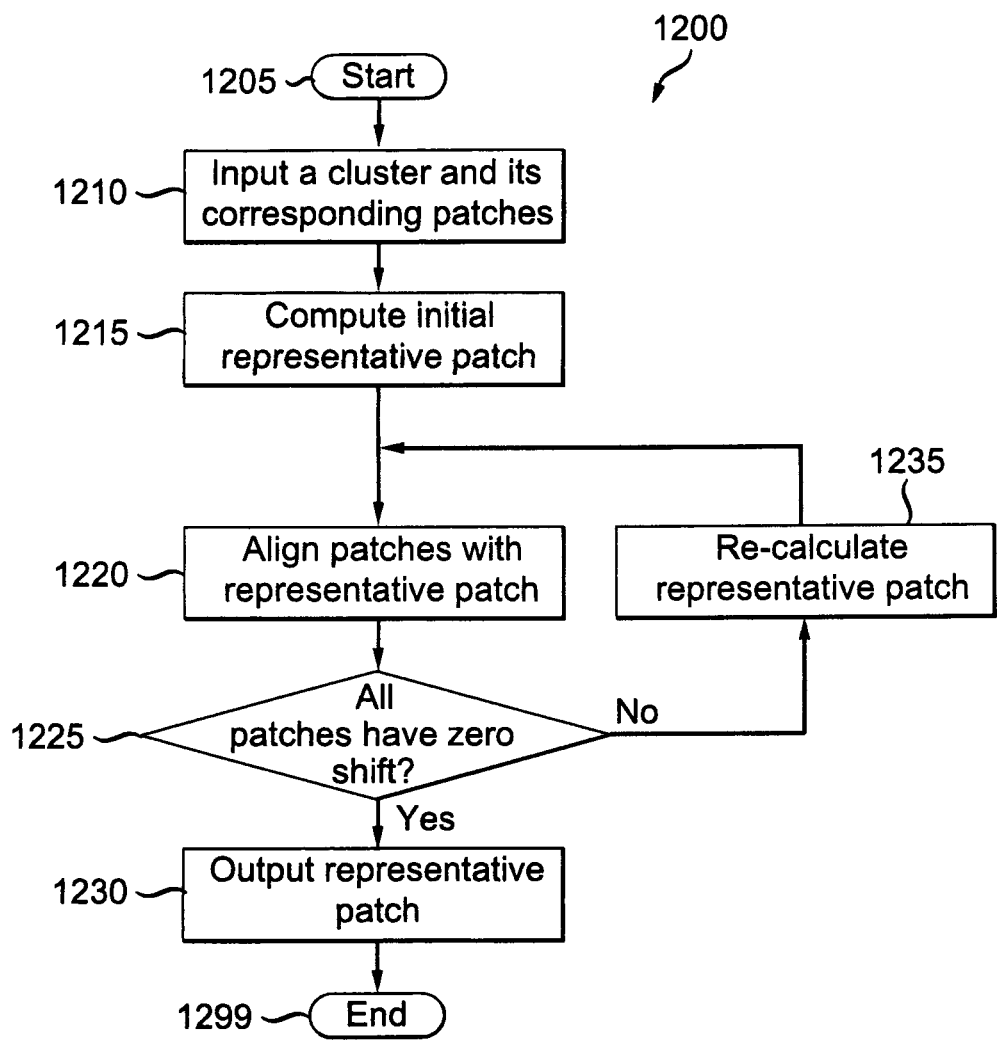
FIG. 12 is a flow diagram showing an exemplary method for generating improved representative patches, in accordance with an embodiment of the present principles.

Turning to FIG. 12, an exemplary method for generating improved representative patches is indicated generally by the reference numeral 1200. The method 1200 includes a start block 1205 that passes control to a function block 1210. The function block 1210 inputs a cluster and its patches, and passes control to a function block 1215. The function block 1215 computes an initial representative patch, and passes control to a function block 1220. The function block 1220 aligns patches with the representative patch, and passes control to a decision block 1225. The decision block 1225 determines whether or not all patches have zero shift. If so, then control is passed to a function block 1230. Otherwise, control is passed to a function block 1235. The function block 1230 outputs the representative patch, and passes control to an end block 1299. The function block 1235 re-calculates a representative patch, and returns control to the function block 1220.

Experimental Results

We have tested the patch shifting algorithm on various videos for the example-based video super resolution application. The results have shown that the patch shifting algorithm with sub-pixel shift and MRF optimization significantly reduced jittering artifacts caused by motion.

Various Embodiments and Variations
1. The MRF based framework may be replaced with some other cost function based formulations.
2. The MRF cost function of Equation (3) may be minimized by different optimization methods.
3. The second term in Equation (3) may be replaced with other boundary conditions.
4. Various (different) formulations may be used for the third term in Equation (3).
5. Replacement of the method described herein regarding generating better representative patches with various other methods and approaches.

A description will now be given of some of the many attendant advantages/features of the present invention, some of which have been mentioned above. For example, one advantage/feature is an apparatus having a patch generator for generating, from an input video sequence, one of more high resolution replacement patches. The one or more high resolution replacement patches are for replacing one or more low resolution patches during a reconstruction of the input video sequence. The patch generator generates the one or more high resolution replacement patches using data corresponding to a patch spatial shifting process. The patch spatial shifting process is for reducing jittery artifacts caused by a motion-induced vector quantization error in the one or more high resolution replacement patches. The data is for at least deriving a patch size of the one or more high resolution replacement patches such that the one or more high resolution replacement patches are generated to have the patch size greater than a patch size of the one or more low resolution patches in order to be suitable for use in the patch spatial shifting process.

Another advantage/feature is the apparatus having the patch generator as described above, wherein the motion-induced vector quantization error is caused by a quantization process applied during the generating of the one or more high resolution replacement patches.

Yet another advantage/feature is the apparatus having the patch generator wherein the motion-induced vector quantization error is caused by a quantization process applied during the generating of the one or more high resolution replacement patches as described above, wherein the quantization process corresponds to a clustering process applied to a plurality of patches extracted from the input video sequence, the clustering process for grouping together ones of the plurality patches having similar characteristics based on one or more criterion, the one or more high resolution replacement patches being derived from the ones of the plurality of patches.

Still another advantage/feature is the apparatus having the patch generator wherein the quantization process corresponds to a clustering process applied to a plurality of patches extracted from the input video sequence, the clustering process for grouping together ones of the plurality patches having similar characteristics based on one or more criterion, the one or more high resolution replacement patches being derived from the ones of the plurality of patches as described above, wherein the clustering process comprises averaging the ones of the plurality of patches in a same cluster, and the patch spatial shifting process is applied to the ones of the plurality of patches subsequent to selecting the ones of the plurality of patches for inclusion in the same cluster and prior to the averaging of the ones of the plurality of patches in the same cluster in order to align object edges within the ones of the plurality of patches in preparation for the averaging.

Moreover, another advantage/feature is the apparatus having the patch generator wherein the clustering process comprises averaging the ones of the plurality of patches in a same cluster, and the patch spatial shifting process is applied to the ones of the plurality of patches subsequent to selecting the ones of the plurality of patches for inclusion in the same cluster and prior to the averaging of the ones of the plurality of patches in the same cluster in order to align object edges within the ones of the plurality of patches in preparation for the averaging as described above, wherein only some of the ones of the plurality of patches in the same cluster are averaged based on a corresponding patch distance from a cluster center.

Further, another advantage/feature is the apparatus having the patch generator as described above, wherein the motion-induced vector quantization error is caused by a patch replacement process performed during the reconstruction of the input video sequence.

Also, another advantage/feature is the apparatus having the patch generator as described above, wherein the apparatus further includes a down-sizer for generating the one or more down-sized pictures from the input video sequence; and one or more video encoders in signal communication with the patch generator and the down-sizer for encoding the high resolution replacement patches and the one or more down-sized pictures into a resultant bitstream.

Additionally, another advantage/feature is the apparatus having the patch generator as described above, wherein the method is performed in a video encoder.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
   a patch generator for generating, from an input video sequence, one or more high resolution replacement patches, the one or more high resolution replacement patches for replacing one or more low resolution patches during a reconstruction of the input video sequence,
   wherein said patch generator generates the one or more high resolution replacement patches through a clustering process on patches extracted from the input video sequence followed by averaging corresponding extended patches from the input video sequence, the extended patches being those extracted patches from the input video sequence with an additional boundary extension and being of a larger size than patches extracted from the input video sequence, and the high resolution replacement patches being larger than the one or more low resolution patches a patch size of the one or more low resolution patches in order to be suitable for use in the patch spatial shifting process and wherein the patch generator uses a patch spatial shifting process that uses a portion of the extended patches having minimum Euclidean distance when shifted between the corresponding portion of the extended patches and the low resolution patches.

2. The apparatus of claim 1, wherein the motion-induced vector quantization error is caused by a quantization process applied during the generating of the one or more high resolution replacement patches.

3. The apparatus of claim 2, wherein the quantization process corresponds to a clustering process applied to a plurality of patches extracted from the input video sequence, the clustering process for grouping together ones of the plurality patches having similar characteristics based on one or more criterion, the one or more high resolution replacement patches being derived from the ones of the plurality of patches.

4. The apparatus of claim 1, wherein the motion-induced vector quantization error is caused by a patch replacement process performed during the reconstruction of the input video sequence.

5. The apparatus of claim 1, wherein the apparatus further comprises:
   a down-sizer for generating the one or more down-sized pictures from the input video sequence; and
   one or more video encoders in signal communication with the patch generator and the down- sizer for encoding the high resolution replacement patches and the one or more down-sized pictures into a resultant bitstream.

6. The apparatus of claim 1, wherein the method is performed in a video encoder.

7. An apparatus, comprising:
   a patch generator for generating, from an input video sequence, one or more high resolution replacement patches, the one or more high resolution replacement patches for replacing one or more low resolution patches during a reconstruction of the input video sequence,
   wherein said patch generator generates the one or more high resolution replacement patches using data corresponding to a patch spatial shifting process, the patch spatial shifting process for reducing jittery artifacts caused by a motion-induced vector quantization error in the one or more high resolution replacement patches, the data for at least deriving a patch size of the one or more high resolution replacement patches such that the one or more high resolution replacement patches are generated to have the patch size greater than a patch size of the one or more low resolution patches in order to be suitable for use in the patch spatial shifting process,
   wherein the motion-induced vector quantization error is caused by a quantization process applied during the generating of the one or more high resolution replacement patches,
   wherein the quantization process corresponds to a clustering process applied to a plurality of patches extracted from the input video sequence, the clustering process for grouping together ones of the plurality patches having similar characteristics based on one or more criterion, the one or more high resolution replacement patches being derived from the ones of the plurality of patches, and
   wherein the clustering process comprises averaging the ones of the plurality of patches in a same cluster, and the patch spatial shifting process is applied to the ones of the plurality of patches subsequent to selecting the ones of the plurality of patches for inclusion in the same cluster and prior to the averaging of the ones of the plurality of patches in the same cluster in order to align object edges within the ones of the plurality of patches in preparation for the averaging.

8. The apparatus of claim 7, wherein only some of the ones of the plurality of patches in the same cluster are averaged based on a corresponding patch distance from a cluster center.

9. A method performed using a processor, comprising:
   generating, from an input video sequence, one or more high resolution replacement patches, the one or more high resolution replacement patches for replacing one or more low resolution patches during a reconstruction of the input video sequence,
   wherein said generating step generates the one or more high resolution replacement patches through a clustering process on patches extracted from the input video sequence followed by averaging corresponding extended patches from the input video sequence, the extended patches being those extracted patches from the input video sequence with an additional boundary extension and being of a larger size than patches extracted from the input video sequence, and the high resolution replacement patches being larger than the one or more low resolution patches a patch size of the one or more low resolution patches in order to be suitable for use in the patch spatial shifting process and wherein the patch generator uses a patch spatial shifting process that uses a portion of the extended patches having minimum Euclidean distance when shifted between the corresponding portion of the extended patches and the low resolution patches.

10. The method of claim 9, wherein the motion-induced vector quantization error is caused by a quantization process applied during the generating of the one or more high resolution replacement patches.

11. The method of claim 10, wherein the quantization process corresponds to a clustering process applied to a plurality of patches extracted from the input video sequence, the clustering process for grouping together ones of the plurality patches having similar characteristics based on one or more criterion, the one or more high resolution replacement patches being derived from the ones of the plurality of patches.

12. The method of claim 9, wherein the motion-induced vector quantization error is caused by a patch replacement process performed during the reconstruction of the input video sequence.

13. The method of claim 9, further comprising encoding the high resolution replacement patches and the one or more down-sized pictures into a resultant bitstream.

14. The method of claim 9, wherein the method is performed in a video encoder.

15. A method performed using a processor, comprising:
generating, from an input video sequence, one or more high resolution replacement patches, the one or more high resolution replacement patches for replacing one or more low resolution patches during a reconstruction of the input video sequence,
wherein said generating step generates the one or more high resolution replacement patches using data corresponding to a patch spatial shifting process, the patch spatial shifting process for reducing jittery artifacts caused by a motion-induced vector quantization error in the one or more high resolution replacement patches, the data for at least deriving a patch size of the one or more high resolution replacement patches such that the one or more high resolution replacement patches are generated to have the patch size greater than a patch size of the one or more low resolution patches in order to be suitable for use in the patch spatial shifting process,
wherein the motion-induced vector quantization error is caused by a quantization process applied during the generating of the one or more high resolution replacement patches,
wherein the quantization process corresponds to a clustering process applied to a plurality of patches extracted from the input video sequence, the clustering process for grouping together ones of the plurality patches having similar characteristics based on one or more criterion, the one or more high resolution replacement patches being derived from the ones of the plurality of patches, and
wherein the clustering process comprises averaging the ones of the plurality of patches in a same cluster, and the patch spatial shifting process is applied to the ones of the plurality of patches subsequent to selecting the ones of the plurality of patches for inclusion in the same cluster and prior to the averaging of the ones of the plurality of patches in the same cluster in order to align object edges within the ones of the plurality of patches in preparation for the averaging.

16. The method of claim 15, wherein only some of the ones of the plurality of patches in the same cluster are averaged based on a corresponding patch distance from a cluster center.

17. An apparatus, comprising:
a patch shifter for receiving one or more high resolution replacement patches having a motion-induced vector quantization error and at least spatially shifting the one or more high resolution replacement patches to reduce jittery artifacts caused by the motion-induced vector quantization error, the one or more high resolution replacement patches corresponding to and derived from an input video sequence through a clustering process on patches extracted from the input video sequence followed by averaging corresponding extended patches from the input video sequence, the extended patches being those extracted patches from the input video sequence with an additional boundary extension and being of a larger size than patches extracted from the input video sequence, and the high resolution replacement patches being larger than the one or more low resolution patches and wherein the patch generator uses a patch spatial shifting process that uses a portion of the extended patches having minimum Euclidean distance when shifted between the corresponding portion of the extended patches and the low resolution patches; and
a picture reconstruction device in signal communication with said patch shifter for reconstructing the input video sequence using the one or more spatially shifted high resolution replacement patches and one or more down-sized pictures corresponding to and derived from the input video sequence.

18. The apparatus of claim 17, wherein the input video sequence is reconstructed in at least one of a vector quantization based compression process, an example-based video super resolution process, a video epitome process, and a video pruning process for video compression.

19. The apparatus of claim 17, wherein the high resolution replacement patches are spatially and temporally shifted using spatial and temporal constraints, respectively.

20. The apparatus of claim 17, wherein a Markov Random Field is used to enforce spatiotemporal smoothness in the reconstructed video sequence.

21. The apparatus of claim 20, wherein the Markov Random Field is implemented a cost function, wherein patch shift coordinates are used as variables of the cost function to determine a corresponding shift for a corresponding one of the one or more high resolution replacement patches.

22. The apparatus of claim 17, wherein the spatial shifting comprises sub-pixel patch shifting to further reduce the jittery artifacts.

23. The apparatus of claim 22, wherein the sub-pixel patch shifting is used in a hierarchical patch matching process where a pixel patch shifting process is used to estimate a position of a low resolution patch that is to be replaced by one of the one or more high resolution replacement patches, and then a sub-pixel patch shifting process is performed to refine the estimate, and wherein a narrow range is used in the sub-pixel patch shifting process than in the pixel patch shifting process.

24. The apparatus of claim 17, wherein the apparatus further comprises a video decoder in signal communication with the patch shifter for decoding the high resolution replacement patches and the one or more down-sized pictures from a bitstream.

25. The apparatus of claim 17, wherein the apparatus is comprised in a video decoder.

26. A method performed using a processor, comprising:
receiving one or more high resolution replacement patches having a motion-induced vector quantization error;
at least spatially shifting the one or more high resolution replacement patches to reduce jittery artifacts caused by the motion-induced vector quantization error, the one or more high resolution replacement patches corresponding to and derived from an input video sequence through a clustering process on patches extracted from the input video sequence followed by averaging corresponding extended patches from the input video sequence, the extended patches being those extracted patches from the input video sequence with an additional boundary extension and being of a larger size than patches extracted from the input video sequence, and the high resolution replacement patches being larger than the one or more low resolution patches and wherein the patch generator uses a patch spatial shifting process that uses a portion of the extended patches having minimum Euclidean distance when shifted between the corresponding portion of the extended patches and the low resolution patches; and reconstructing the input video sequence using the one or more spatially shifted high resolution replacement patches and one or more down-sized pictures corresponding to and derived from the input video sequence.

27. The method of claim 26, wherein the input video sequence is reconstructed in at least one of a vector quantization based compression process, an example-based video super resolution process, a video epitome process, and a video pruning process for video compression.

28. The method of claim 26, wherein the high resolution replacement patches are spatially and temporally shifted using spatial and temporal constraints, respectively.

29. The method of claim 26, wherein a Markov Random Field is used to enforce spatiotemporal smoothness in the reconstructed video sequence.

30. The method of claim 29, wherein the Markov Random Field is implemented a cost function, wherein patch shift coordinates are used as variables of the cost function to determine a corresponding shift for a corresponding one of the one or more high resolution replacement patches.

31. The method of claim 26, wherein the spatial shifting comprises sub-pixel patch shifting to further reduce the jittery artifacts.

32. The method of claim 31, wherein the sub-pixel patch shifting is used in a hierarchical patch matching process where a pixel patch shifting process is used to estimate a position of a low resolution patch that is to be replaced by one of the one or more high resolution replacement patches, and then a sub-pixel patch shifting process is performed to refine the estimate, and wherein a narrow range is used in the sub-pixel patch shifting process than in the pixel patch shifting process.

33. The method of claim 26, further comprising decoding the high resolution replacement patches and the one or more down-sized pictures from a bitstream.

34. The method of claim 26, wherein the method is performed in a video decoder.

35. A non-transitory computer readable storage media having video signal data encoded thereupon, comprising:

one or more high resolution replacement patches generated from an input video sequence, the one or more high resolution replacement patches for replacing one or more low resolution patches during a reconstruction of the input video sequence, wherein the one or more high resolution replacement patches are generated through a clustering process on patches extracted from the input video sequence followed by averaging corresponding extended patches from the input video sequence, the extended patches being those extracted patches from the input video sequence with an additional boundary extension and being of a larger size than patches extracted from the input video sequence, and the high resolution replacement patches being larger than the one or more low resolution patches a patch size of the one or more low resolution patches in order to be suitable for use in the patch spatial shifting process and wherein the patch generator uses a patch spatial shifting process that uses a portion of the extended patches having minimum Euclidean distance when shifted between the corresponding portion of the extended patches and the low resolution patches.

* * * * *